United States Patent [19]
Sansom et al.

[11] Patent Number: 5,598,413
[45] Date of Patent: Jan. 28, 1997

[54] FOUR-WIRE, HALF-RATE ARCHITECTURE WITH EMBEDDED DIFFERENTIAL DELAY COMPENSATION FOR EXTENDING RANGE OF BASIC RATE ISDN COMMUNICATIONS

[75] Inventors: Michael S. Sansom, Huntsville; Lonnie S. McMillian, Madison; Roger W. Cain, Somerville; Robert J. Toth, Huntsville; Gary M. Willoughby, Harvest, all of Ala.

[73] Assignee: Adtran, Inc., Huntsville, Ala.

[21] Appl. No.: 500,441

[22] Filed: Jul. 10, 1995

[51] Int. Cl.[6] ........................................ H04T 3/06
[52] U.S. Cl. .................. 370/468; 370/536; 370/516
[58] Field of Search .................... 370/84, 85.9, 105.1, 370/108, 110.1, 112, 118; 375/260

[56] References Cited

U.S. PATENT DOCUMENTS

| | | | |
|---|---|---|---|
| 4,577,312 | 3/1986 | Nash | 370/84 |
| 4,630,286 | 12/1986 | Betts | 375/260 |
| 4,775,987 | 10/1988 | Miller | 370/108 |
| 4,885,738 | 12/1989 | Bowers et al. | 370/58.1 |
| 5,065,396 | 11/1991 | Castellano et al. | 370/84 |
| 5,119,402 | 6/1992 | Ginzburg et al. | 375/260 |
| 5,202,886 | 4/1993 | Rossi et al. | 370/112 |
| 5,231,649 | 7/1993 | Duncanson | 375/38 |
| 5,251,210 | 10/1993 | Mann et al. | 370/84 |
| 5,293,378 | 3/1994 | Shimizu | 370/94.1 |
| 5,351,239 | 9/1994 | Black et al. | 370/84 |

*Primary Examiner*—Hassan Kizou
*Attorney, Agent, or Firm*—Charles E. Wands

[57] ABSTRACT

To extend the transmission distance for basic rate integrated services digital network (ISDN) communications between a first site and a second site, the basic rate ISDN channel is demultiplexed onto a pair of half-rate digital subscriber loop channels, which employ an out of band maintenance channel to convey differential delay compensation information, but without modifying the framing structure of the transported channels, or requiring additional bandwidth for a separate framing channel. Halving the data rate, to increase the distance over which the basic rate ISDN channel may be transported, operates as a trade-off against loop loss, while still complying with ANSI standards.

21 Claims, 2 Drawing Sheets

Four-wire, half-rate architecture with embedded differential delay compensation for extending range of basic rate ISDN communications

FIELD OF THE INVENTION

The present invention relates in general to communication systems, and is particularly directed to the use of a pair of demultiplexed half-rate, integrated services digital network (ISDN) channels, which employ an out of band maintenance channel for conveying differential delay compensation information, to extend the normal range of ISDN basic rate digital subscriber lines to distances (on the order of 25 kft) well beyond those currently possible (typically 15.2 kft) using a repeater-less two-wire transmission path.

BACKGROUND OF THE INVENTION

In order to meet the ANSI standard T1.601 for 2B1Q modulation, two-wire, full-duplex data transfer with echo cancellation, currently installed ISDN basic rate digital subscriber lines (having a data rate of 144 kb, with bidirectional data payload, plus overhead maintenance channels) must not exceed a two-wire loop loss of 42 dB at 40 KHz, or 1300 ohms, resistive. These requirements effectively limit the operational range of such a two-wire loop to approximately 15.2 kft, using No. 26 (American Wire Gauge) wire, and commercially available ISDN trasceiver interface equipment. Extending ISDN communications to customers geographically located beyond this range requires the service provider to either install repeaters in the loop, or to use a different communication medium, such as a T1 carrier fiber optic link. Unfortunately, each of these alternative solutions to the extended range problem has a penalty attached to it.

The ISDN repeater approach requires both an office end repeater powering unit, and a repeater mounting pole, or a subterranean (bell jar) environmentally hardened housing for the repeater. This not only involves the use of additional equipment (including the cost of the hardware and its installation), but the expense and labor of maintaining the repeater enclosure. Similarly, although T1 channel banks, located in both the ISDN switch office and another downstream location (office or remote hut) that is geographically 'close' to the subscriber premises, are able to accept basic rate interface transmission extender (BRITE) cards for T1 carrier extension, the fact that T1 carrier systems are configured to include capacity for multiple extended basic rate services means that their use to deliver only a single basic rate extended service is prohibitively expensive and impractical.

SUMMARY OF THE INVENTION

In accordance with the present invention, the desire to extend basic rate ISDN services to customer premises equipment that is located beyond the presently allowable two-wire loop range of approximately 15.2 kft of 26 AWG loop, without entailing a major cost penalty, such as accompanies the alternative options described above, is successfully addressed by taking advantage of an additional (unused) wire pair that is typically available in the multi-wire cable employed for two wire basic rate ISDN services, to demultiplex a basic rate ISDN channel into a pair of half-rate digital subscriber loop ISDN channels for transport over a four-wire transmission path between a central office site and a customer premises site. The reduction in (halving) the data rate operates as a trade-off against loop loss, and increases the distance over which the basic rate ISDN channel may be used and still meet ANSI standards.

Since the two, half-rate digital subscriber loop (HR DSL) channels are demultiplexed onto separate communication paths (which necessarily include the half-rate signal processing components and the two-wire pairs between central office and remote end, subscriber premises equipments), there will be a differential transport delay or offset between the two half-rate channels, which must be corrected in order for the two demultiplexed channels to be properly time aligned and multiplexed back into the original basic rate ISDN format at the receive end of the four-wire ISDN link.

This differential transport delay between the two half-rate DSL channels is compensated by using an out of band maintenance channel portion of one of the two half-rate channels to convey time of start and time of arrival measurement information to the other end of the four-wire link, and thereby enable supervisory communication control processors at one or both ends of the four-wire link to control the insertion of the requisite amount of delay in the faster of the two channels, achieving the necessary time alignment for multiplexing the two half-rate channels back into the original basic rate channel.

To this end, each of an 'upstream' central office site and a 'downstream' customer premises site at the opposite ends of the four-wire link is terminated to the ISDN signalling ports of a pair of half-rate clocked transceiver interface units. Bidirectional digital ports of the pair of half-rate transceiver interface units are delay equalization—multiplexed to the bidirectional digital port of a basic rate transceiver interface unit, which has an ISDN signalling port with which basic rate ISDN channel signals are interfaced. In a preferred embodiment of the invention, each of the half-rate and basic rate transceiver interface units is comprised of the same commercially available transceiver interface chip, but with the half-rate transceivers being clocked at half the rate of the basic rate transceiver chip.

The invention takes advantage of the communication signal processing functionality of the ISDN transceiver interface chips to pre-establish, at a first (central office) end of the four-wire link, a prescribed differential (lead time) offset between the superframe synchronization signal structure inherent in the operation of each transceiver interface chip for a first (or leading) of the two half-rate ISDN channels relative to the superframe synchronization signal structure for a second (or lagging) of the two half-rate ISDN channels.

In addition, an available (normally unused) portion of the out of band maintenance channel of the leading half-rate DSL channel is used to mark that channel as having its leading superframe synchronization structure started first, so that transceiver equipment at the downstream customer premises site will know which of the received two half-rate DSL channels is the 'leading' channel, regardless of which two-wire pair has conveyed that channel. This 'marking' of the leading channel allows the terminations of the two two-wire pairs to the transceiver interface units at a respective end of the four-wire link to be physically swapped, without impairing the signal processing capabilities of the system.

At the downstream (customer premises) end of the four-wire link, the differential delay between the superframe boundaries of the two (leading and lagging) half-rate DSL channels is measured and compared with the expected delay offset between the marked (leading) half-rate channel and the unmarked (lagging) half-rate channel. Knowing that the superframe synchronization signal structure of the marked (leading) half-rate DSL channel was started first by its half-rate clocked transceiver at the central office site, and by a prescribed lead time relative to the lagging half-rate channel, the difference in transport delay between the two half-rate DSL channels is computed by the customer premises equipment site's communications control processor.

In accordance with a first embodiment of the invention, this computed delay is employed by the customer premises site's processor to control the injection of the necessary delay offset (by way of delay circuitry contained in the multiplexer for combining the two received half-rate DSL channels) into the faster one of the two channels, thereby providing the required time alignment for recovering the basic rate channel. In a second embodiment of the invention, rather than provide delay equalization in the multiplexer path within the customer premises site, the customer premises site's processor injects a received delay representative message in the out of band maintenance channel portion of one of the return path half-rate channels. This delay offset message in the return channel is used by the central office site's communications control processor to control the injection of the insertion of delay in the faster half-rate channel demultiplexed at the central office site, thereby providing pre-transmission time alignment that will allow the multiplexer in the downstream customer premises site to recover the basic rate channel. This allows the signal processing hardware at the customer premises site to be simplified by performing all delay equalization at the central office site.

For half-rate DSL channels in the return direction (from the customer premises back to the central office), since the return direction superframes are defined by the downstream superframe boundaries inherent in the received half-rate DSL channels, it is not possible to use the half-rate transceiver chips in the customer premises site to invoke a prescribed (leading and lagging) offset between the superframe structures of the respective return half-rate channels as carried out in the central office site, as described above. This potential shortcoming at the downstream end of the link is circumvented by measuring the actual offset between the superframe boundaries of the return channels, and then incorporating return channel framing message representative of the relative delay between the framing structures of the return half-rate channels into a usurped portion of the out of band maintenance channel portion of one of the two return half-rate channels, similar to injection of the received delay representative message in the out of band maintenance channel portion of one of the return path half-rate channels, described above.

At the central office site, similar to the framing delay measurement processing carried out at the customer premises site, described above, the differential delay between the superframe structures of the two return link half-rate channels is measured and compared with the measured framing transmission offset message in the out of band maintenance channel portion of one of the return path half-rate channels. Any difference between the two is employed to delay the faster half-rate channel within the multiplexed digital signal path at the central office site, and thereby correct for the differential transmission path delay in the return direction.

DETAILED DESCRIPTION

Figure 1:
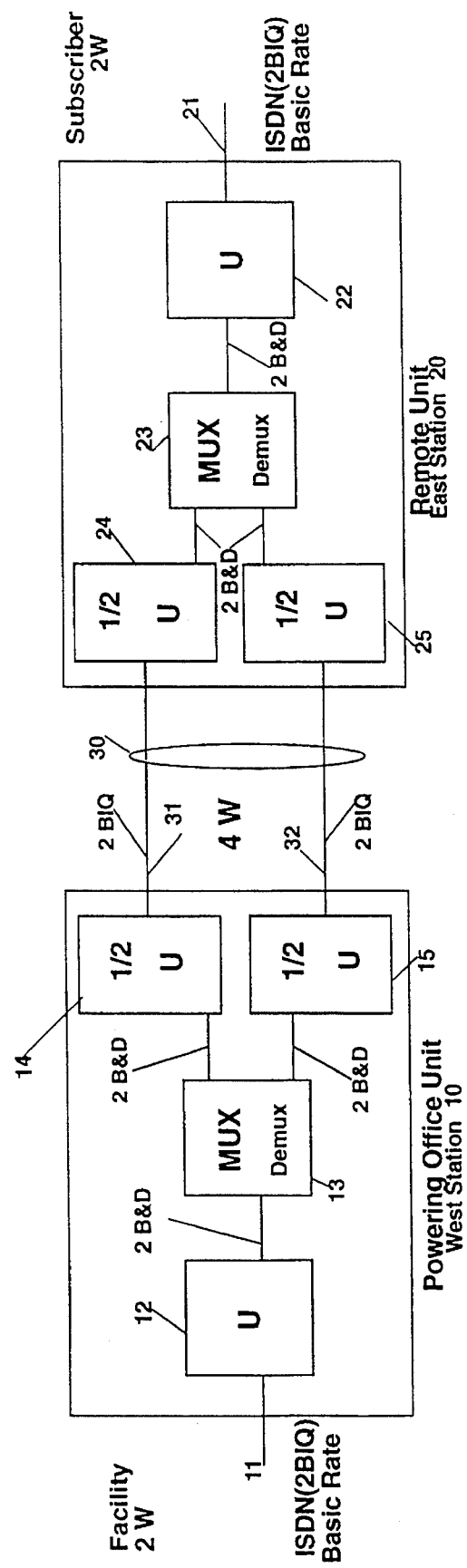
FIG. 1 diagrammatically illustrates the manner in which a conventional basic rate ISDN network architecture interconnecting a 'west' (central office) station and an 'east' (customer premises) station is modified in accordance with the present invention, to enable customer premises equipment to be located well beyond the customary maximum allowable length (15.2 kft, 26 AWG) defined by ANSI performance standards.

Before describing in detail the four wire, delay offset-compensated, sub-rate demultiplexed ISDN architecture of the present invention, that enables the range of a basic rate ISDN link to be extended well beyond its normal two-wire loop length, it should be observed that the present invention resides primarily in what is effectively a prescribed set of conventional telecommunication signalling hardware components and attendant supervisory communications microprocessor circuitry therefor, that controls the operations of such components. Consequently, the configuration of such components and the manner in which they are interfaced with other communication equipment of a telephone network have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to show the major components of the system in a convenient functional grouping, whereby the present invention may be more readily understood.

FIG. 1 diagrammatically illustrates the manner in which a conventional basic rate ISDN network architecture between a 'west' (central office) station 10 and an 'east' (customer premises) station 20 is modified in accordance with the present invention, so as to allow the customer premises equipment to be located well beyond the present two-wire loop range of approximately 15.2 kft of 26 AWG, described above. As shown in FIG. 1, in place of the conventional two-wire pair between communication sites, the present invention employs an additional (unused) two-wire pair that is typically available within the multi-wire cable employed for two wire basic rate ISDN services, to provide a four wire (two two-wire pairs) link 30, that supports two, demultiplexed, half-rate ISDN channels between the west site 10 and the east site 20. As noted earlier, halving the data rate serves as a trade-off against loop loss, and thereby enables the length of wire over which the basic rate ISDN channel is to be transported to be geographically extended (up to a distance on the order of 25 kft), while still complying with industry (ANSI) performance standards.

At the central office site 10, a basic rate ISDN two-wire link 11 is coupled to the ISDN (2B1Q) port of a full rate interface unit 12, and has its digital output 2B+D output signals demultiplexed through a bidirectional multiplexer, demultiplexer (mux/demux) unit 13 over a pair of 2B+D digital channels that are applied to the digital communication ports of first and second half-rate interface units 14 and 15. Half-rate 2B1Q signals are coupled between interface units 14 and 15 and upstream ends of two-wire pairs 31 and 32 of a four-wire link 30 to a remote, customer premises site 20. Each of interface units 12, 14 and 15 preferably comprises a commercially available, basic rate ISDN transceiver interface U-chip, (that is normally clocked at 80 KHz for standard four level 2B1Q ISDN signals). The difference between half-rate transceiver interface chips 14 and 15 and full-rate transceiver interface chip 12 is the driving clock rate. Transceiver 12 is clocked at the standard 80 KHz clock rate for four level 2B1Q signalling, while transceivers 14 and 15 are clocked at half this clock frequency, or 40 KHz.

In a complementary fashion, at the customer premises site 20, a basic rate ISDN two-wire link 21 that serves associated customer premises equipment, is coupled to a full rate transceiver interface unit 22, the output of which is demultiplexed into digital 2B+D signals through a bidirectional multiplexer, demultiplexer (mux/demux) unit 23 to first and second half-rate transceiver interface units 24 and 25, which are coupled to the downstream end of two wire pairs 31 and 32, respectively. Like the transceiver interface units at the central office site 10, interface units 22, 24 and 25 comprise commercially available, basic rate ISDN transceivers interface U-chips, normally clocked at 80 KHz for standard four level 2B1Q ISDN signals. As in the central office, transceiver 22 is clocked at the standard 80 KHz clock rate, while transceivers 24 and 25 are clocked at 40 KHz.

In normal operation, considering, for example, a communication from the west (central office) end 10 of the network to the east (customer premises) end 20 of the network, in the transmit direction, the 80 KHz-clocked full rate transceiver interface 12 of a site 10 processes an incoming full rate 2B1Q ISDN channel into 2B+D digital signals, which are demultiplexed by mux/demux 13 into a pair of 2B+D digital channels for application to respective ones of the half-rate (40 KHz-clocked) transceiver interfaces 14 and 15. These two 40 KHz 2B+D digital channels are transmitted as outgoing half-rate four level 2B1Q signals onto the respective two wire pairs 31 and 32 of the four wire link 30 and transported thereby to half rate interface 24 and half rate interface 25, respectively of the (customer premises) site 20. At site 20, the two received half-rate HR DSL channels are then multiplexed through multiplexer 23 into a full rate 2B+D channel to the digital port of transceiver interface 22, which outputs a basic rate 2B1Q ISDN channel onto two-wire link 21 for delivery to customer premises equipment.

As described briefly above, because the two half-rate channels (HR DSL1 and HR DSL2) transmitted by interface units 14 and 15 onto two-wire pairs 31 and 32 are demultiplexed through separate communication paths (including the half-rate signal processing components of the interface units themselves and the separate two-wire pairs 31 and 32 between the office and remote end sites 10 and 20), there will be a differential transmission delay between the two half rate channels. This differential delay or offset must be corrected (either at the transmitter, the receiver, or both), in order for the two half-rate channels to be properly time aligned and recombined back into the original basic rate ISDN format.

One prior art approach to solve the problem of differential delay in a sub-rate demultiplexed channel communication system is described in the U.S. patent to Castellano et al, U.S. Pat. No. 5,065,396. The patented system employs what may be termed an augmented sub-rate approach, in which the data rate of each demultiplexed sub-rate channel is slightly higher than a proportional fraction of the basic data rate, in order to provide additional bandwidth to accommodate a framing structure that contains channel steering and alignment information, similar to a packet switched network. Such a scheme has two fundamental shortcomings, which make it impractical and cost prohibitive to the telephone industry.

First, in order to provide the additional bandwidth for the control channel, the data rate of each sub-rate channel must be increased to a frequency slightly higher than a proportional fraction of the basic data rate associated with the number of demultiplexed channels. This not only complicates timing control of the transceiver components, but requires the design of additional overhead circuitry for handling the steering control and differential delays among the respective channels. Secondly, insertion of the control channel requires that the framing structure of the incoming data must be modified to conform with the steering control algorithm.

In accordance with the present invention, however, no separate sub-channel is required to convey the required transmission path differential delay compensation, and the framing structure of the basic rate ISDN channel remains intact, so that the multiplexing—demultiplexing mechanism in each site is 'invisible' to the user. Instead, as described briefly above, advantage is taken of the availability of the out of band maintenance channel of ISDN digital format to transport invoked and measured superframe structure delay offset-representative control messages from one end of the four wire link to the other.

Figure 2:
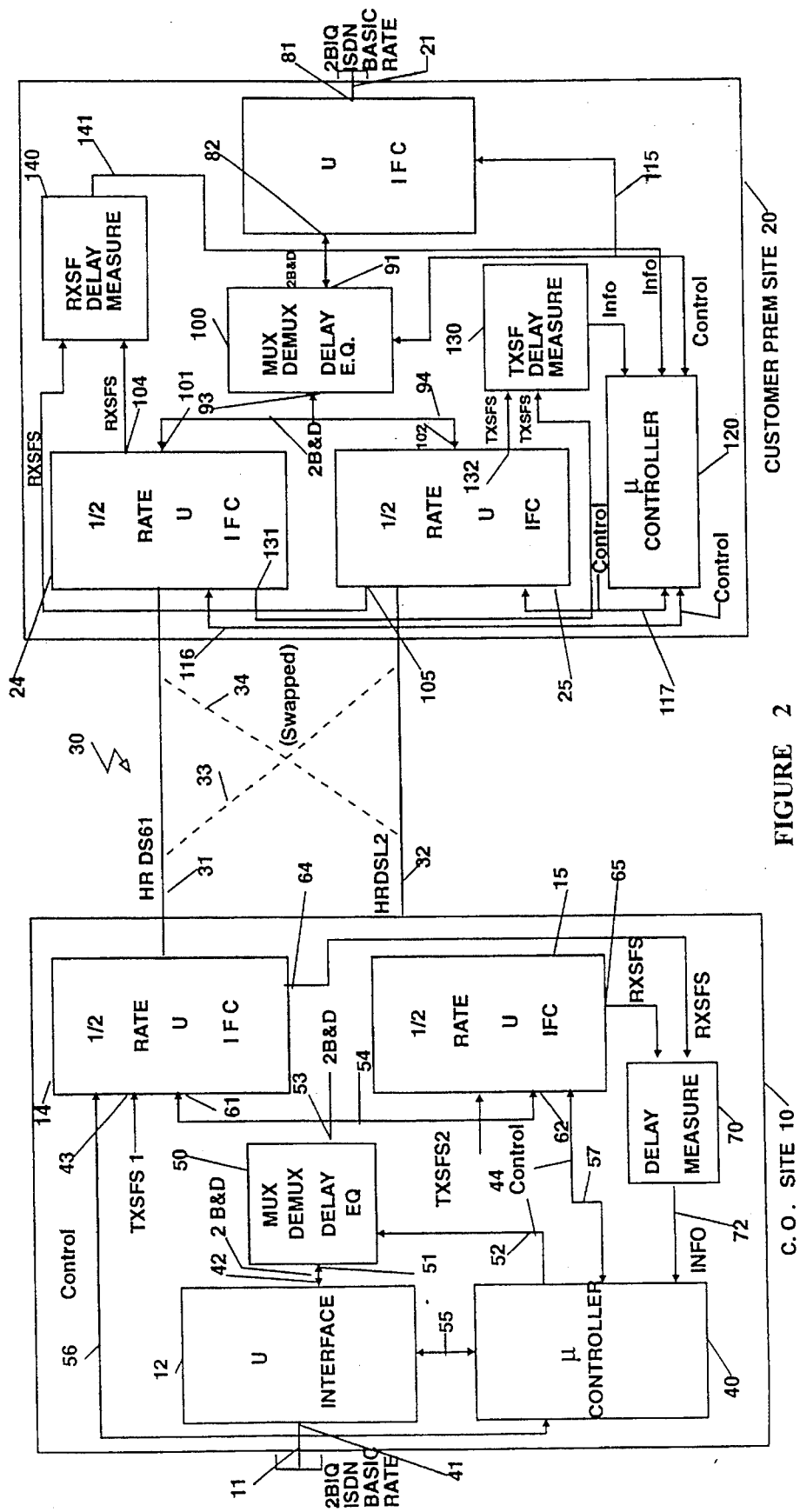
FIG. 2 diagrammatically illustrates the details of each of the central office site 10 and the customer premises station 20 of the extended range ISDN communication system of FIG. 1.

More particularly, FIG. 2 diagrammatically illustrates the details of each of the central office site 10 and the customer premises station 20 of the extended range ISDN communication system of FIG. 1, which enables the transmission distance for basic rate integrated services digital network (ISDN) communications to be extended to an effective transmission path distance, on the order of 25 kft, for example, that exceeds the allowable maximum length (15.2 kft) currently attainable by a repeaterless two-wire system that complies with ANSI defined performance standards. In FIG. 2, the respective half-rate communication links 31 and 32 are denoted as Half-Rate Digital Subscriber Link 1 (HR DSL1) and Half-Rate Digital Subscriber Link 2 (HR DSL2), respectively.

Within the central office site 10, the basic rate ISDN transceiver interface 12, which preferably comprises a commercially available U-transceiver chip, as described above with reference to FIG. 1, is shown as having a first bidirectional port 41, which is coupled to interface 2B1Q ISDN signals with respect to the first basic rate ISDN link 11 from the network, and a second bidirectional port 42 that interfaces 2B+D digital signals with a first bidirectional port 51 of a bidirectional multiplexer-demultiplexer (mux-demux) 50. Mux-demux 50 is of conventional construction, employing delay circuitry in each of its respective bidirectional channel paths, so as to provide for the insertion of a controlled amount of delay in either or both channels, under the control of an attendant supervisory communications control microprocessor 40.

Mux-demux 50 has a second bidirectional port 53 coupled via bus 54 to data ports 61 and 62 of first and second half-rate ISDN interface transceivers 14 and 15, which, as noted earlier, are identical to ISDN interface transceiver unit 12, but are clocked at only half the basic ISDN clock rate. Transceiver interface chips 12, 14 and 15 are controlled via respective control links 55, 56, and 57 from processor 40. Each transceiver chip customarily contains an internal multi-stage elastic buffer, the state of which is non-accessible and typically unknown upon power up and reset, so that it can be expected that serial data stream processed through each transceiver will have an intrinsic delay that is not a priori definable. As a consequence, in addition to the transport delay through each of two-wire links 31 and 32 between the central office site 10 and the customer premises site 20, the transport delay for each half-rate HR DSL channel necessarily includes the intrinsic delays through its associated half-rate transceiver interface chips at both the transmit end and the receive end of its respective two-wire path. Therefore, in order to properly align the two half-rate channels for recovery of a basic rate ISDN channel at each end of the four-wire link 40, it is necessary to measure the total transport delay in the downstream direction, and the total transport delay in the upstream direction, which, due to the intrinsic delays through the transceiver chips, reference above, can be expected to be different from that in the downstream direction.

For this purpose, in accordance with a first embodiment of the invention, for return channels from the downstream customer premises site, the delay circuitry of mux/demux 50 is controlled, via a control link 52 from control processor 40, to insert a controlled amount of delay in the faster of the two received half-rate channels, so as to provide for time alignment. In addition, pursuant to a second embodiment of the invention, to be described, mux/demux is controlled to insert a prescribed amount of delay in a selected one of the two outgoing (demultiplexed) half-rate channels to be transported to the customer premises site 20.

Considering for the moment, the transmission of a downstream directed basic rate ISDN channel applied via two-wire link 11 to central office site 10 for transmission to customer premises site 20, transceiver 12 is clocked at the full or basic clock rate (80 KHz), and each of transceivers 14 and 15 is clocked at 40 KHz, or half the clock rate employed for basic rate transceiver 12. As mux/demux 50 demultiplexes basic rate data 2B+D digital data stream applied to its first bidirectional port 51 from transceiver interface 12, the digital data stream is alternately clocked into transceiver interface units 14 and 15 and output therefrom as two half-rate four level 2B1Q data streams HR DSL1 and HR DSL2, to be transported over the two, two-wire pairs 31 and 32, respectively, to the customer premises site 20.

As mentioned briefly above, within the transceiver equipment of the central office site 10, the present invention takes advantage of the communication signal processing functionality of the transceiver interface chips 14 and 15 to pre-establish a prescribed differential (lead time) offset between the superframe synchronization signal structure inherent in the transceiver interface for a first 'leading' one of the two half-rate ISDN channels relative to the superframe synchronization signal structure inherent in the transceiver interface for a second 'lagging' one of the two half-rate ISDN channels.

More particularly, transceiver unit 14 and 15 have respective framing control ports 43 and 44, to which transmit superframe synchronization start signals Tx SFS1 and Tx SFS2 are applied by dedicated hardware circuitry for invoking the superframe structure inherent in the operation of the transceiver chips in the course of the transmission of outgoing (half-rate) 2B1Q ISDN channels on two-wire links 31 and 32, respectively. In accordance with the invention, via control signals applied to framing control ports 43 and 44 of transceiver interface units 14 and 15, one of the transceivers (e.g. transceiver 14 associated with the 'leading' half-rate channel HR DSL1) starts its respective (8 KHz) transmit superframe structure a prescribed period of time (e.g. one 125 microsecond framing interval) in advance of enabling the other transceiver (e.g. transceiver 15 associated with 'lagging' half-rate channel HR DSL2) to start its transmit superframe structure. This prescribed relative delay or offset between the superframes for the two half-rate channels provides a known reference for measuring the amount of differential transmission path delay between the two half-rate channels HR DSL1 and HR DSL2 at the downstream or customer premises end of the four-wire link.

In addition, supervisory communications control processor 40 uses an available (normally unused) portion of an out of band maintenance channel (e.g. embedded operations channel, the M4 or the M56 channel) of the leading half-rate channel (HR DSL1, in the present example), to mark that channel (HR DSL1) as having its superframe synchronization structure started first, so that transceiver equipment at the downstream customer premises site 20 will know which of the received two half-rate DSL channels is the 'leading' channel, regardless of which two-wire pair has conveyed that channel. This 'marking' of the leading HR DSL1 channel allows the two, two-wire pairs that make up the four-wire link to be physically swapped, as shown by broken lines 33 and 34, without impairing the signal processing capabilities of the system.

Transceiver interface units 14 and 15 further include received superframe synchronization signal ports 64 and 65, respectively, from which signals Rx SFS1 and Rx SFS 2 that mark the boundaries of received superframes in the half-rate channels transported from the other end of the link are output to a frame sync signal delay measurement unit 70. Frame sync signal delay measurement unit 70 is operative to measure the differential delay between the superframe synchronization signals carried by the return half-rate channels HR DSL1 and HR DSL 2. This superframe offset derived by frame sync signal delay measurement unit 70 is coupled via link 72 to control processor 40, wherein it is compared with return channel framing delay information that has been inserted into an out of band maintenance channel portion of one of the return half-rate ISDN channels by return channel framing delay measurement circuitry at the customer premises site, as will be described.

The return channel framing offset information carried by the out of band maintenance channel in one of the return half-rate channels is representative of the measured differential framing delay between the return half-rate channel superframes transported in the customer premises site-to-central office site return direction. By comparing the actual difference in the received superframe boundaries intrinsic to the two half-rate return channels transmitted by the downstream half-rate transceiver units 24 and 25 at site 20, as detected by frame sync signal delay measurement unit 70, with the differential framing boundary delay for the return half-rate channels, processor 40 determines which of the two half-rate return channels HR DSL1 and HR DSL2 is the faster channel. It also calculates the amount of equalization delay to be inserted into the faster channel that will achieve time alignment between the two return half-rate channels in the course of mux-demux 50 multiplexing the two received half-rate channels into a basic rate channel for application to basic rate ISDN link 11 from port 41 of interface transceiver 12.

Within the transceiver equipment at the customer premises site 20, transceiver interface unit 22 has a first bidirectional ISDN data port 81, which interfaces basic rate four level 2B1Q ISDN signals with the two-wire link 21 serving the customer premises equipment, and a second bidirectional digital data port 82, which interfaces 2B+D digital signals with a first bidirectional port 91 of a mux-demux 100. Mux-demux 100, like mux-demux 50 at the central office site, contains delay circuitry in each of its respective bidirectional channel paths, that provides for the insertion of a controlled amount of delay in either or both channels, under the control of an attendant microprocessor 120.

Mux-demux 100 has a second bidirectional port 93 through which 2B+D signals are coupled via bus 94 to and from data ports 101 and 102 of first and second half-rate ISDN transceivers interface units 24 and 25. ISDN transceivers interface units 24 and 25 are identical to ISDN interface transceiver interface units 14 and 15 at the central office site 10, being clocked at only half the basic ISDN clock rate applied to transceiver interface unit 22. Half-rate transceiver interface units interface units 22 and 24 and basic rate transceiver interface unit 25 are controlled via control links 115, 116, and 117 from communications control processor 120.

In order to measure the offset between the superframe boundaries of the two (leading and lagging) half-rate DSL channels transmitted from the central office site 10, half-rate transceiver interface units 24 and 25 include respective received superframe synchronization signal ports 104 and 105, from which received superframe boundary signals Rx SFS1 and Rx SFS 2 are output to a frame sync signal delay measurement unit 140. As in the central office site, signals Rx SFS1 and Rx SFS 2 are used to mark boundaries of the received superframes in the downstream directed half-rate channels HR DSL1 and HR DSL2 from the central office site. Namely, frame sync signal delay measurement unit 140 measures the differential offset between the superframe synchronization signals carried by the received half-rate channels HR DSL1 and HR DSL 2, and couples this measured differential offset via link 141 to communications control processor 120.

As described above, also transported in the available (normally unused) portion of the out of band maintenance channel of the leading half-rate channel (HR DSL1, in the present example) received from the central office site is a code which marks that channel as having its superframe synchronization structure started first, so that processor 120 will know which of the received two half-rate DSL channels is the 'leading' channel, regardless of which two-wire pair has conveyed that channel.

Processor 120 compares the measured differential on link 141 from frame sync signal delay measurement unit 140 with the prescribed period of time (one 125 microsecond framing interval), by which the leading or marked superframe half-rate channel (HR DSL1) has been started in advance of the 'lagging' half-rate channel HR DSL2), and computes the difference in transport delay differential between the two downstream directed half-rate DSL channels. Using this computed transport delay, via link 115, processor 120 controls mux-demux 100 to inject an adjustable delay offset into the faster one of the two received channels HR DSL1 and HR DSL2, thereby providing the required time alignment for recovering the basic rate channel.

As noted above, in accordance with a second embodiment of the invention, rather than use multiplexer 100 to provide delay equalization in the received signal path, processor 120 generates a downlink transport delay equalization message representative of the transport delay computed by processor 120 by comparing the measured differential on link 141 from frame sync signal delay measurement unit 140 with the prescribed period of time (one 125 microsecond framing interval), by which the leading or marked superframe half-rate channel (HR DSL1) has been started in advance of the 'lagging' half-rate channel HR DSL2). The downlink transport delay equalization message is inserted into the out of band maintenance channel portion of one of the return path half-rate channels (e.g. HR DSL1). This transport delay message in the selected return channel is used by the central office site's communications control processor 40 to control mux-demux 50 to insert delay into the faster half-rate channel demultiplexed and transmitted at the central office site, thereby providing pre-transmission time alignment that will allow the multiplexer 100 in the customer premises site 20 to recover the basic rate channel. This use of the out of band maintenance channel in the return channel for conveying both a superframe boundary offset message, to be described, and the transport dealy offset message allows all delay equalization to be performed at the central office site.

As described previously, in the course of transmitting half-rate DSL channels in the return direction from the customer premises back to the central office, since the return direction superframes are defined by the downstream superframe boundaries inherent in the received half-rate DSL channels, it is not possible to use the half-rate transceiver chips 24 and 25 in the customer premises site 20 to invoke a prescribed start time (leading and lagging) offset between the superframe structures of the respective return half-rate channels, as is carried out in the central office site. Instead, the actual offset between the transmitted superframe boundaries is measured by means a frame sync signal transmit offset measurement unit 130, which is coupled to the respective transmit framing control ports 131 and 132 of transceiver interface units 24 and 25, from which transmit superframe synchronization signals Tx SFS1 and Tx SFS 2 are derived.

Frame sync signal transmit time measurement unit 130 measures the differential delay between the superframe structures of the return half-rate channels and couples this transmission delay measurement to control processor 20, which inserts a return channel framing boundary message into the out of band maintenance channel portion of the return half-rate channel HR DSL1. At the central office site 10, this return channel differential framing boundary message in the out of band maintenance channel portion of the selected return channel HR DSL1 is compared by the control processor 40 with the framing boundary differential measured by the frame sync signal delay measurement unit 70. By comparing the actual difference in framing boundary delays for the two half-rate return channels, as detected by the frame sync signal delay measurement unit 70, with the differential framing boundaries for the return half-rate channels conveyed in the overhead portion of the return channel, processor 40 determines which of the two half-rate return channels HR DSL1 and HR DSL2 is the faster channel, and the amount of delay in the slower channel required to be imparted by mux-demux 50, in order to delay the faster half-rate return channel, and achieve time alignment between the two return half-rate channels in the course of multiplexing back these channels into a basic rate channel for application to basic rate ISDN link 11 from port 41 of interface transceiver 12.

As will be appreciated from the foregoing description, by taking advantage of an additional (unused) wire pair typically available in the multi-wire cable employed for two-wire basic rate ISDN services, and the unused portion of the out of band maintenance channel, the present invention makes it possible to extend basic rate ISDN services to customer premises equipment located beyond the presently allowable two-wire loop range of approximately 15.2 kft, without modifying the framing structure of the transported channel, or requiring additional bandwidth for a separate framing channel. The reduction in (halving) the data rate, to increase the distance over which the basic rate ISDN channel may be transported, operates as a trade-off against loop loss, while still complying with ANSI standards.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of conducting integrated services digital network (ISDN) communications between a first site and a second site comprising the steps of:

(a) providing a plurality of transmission paths between said first and second sites;

(b) measuring the differential transport delay between respective ones of said plurality of transmission paths;

(c) demultiplexing a basic rate ISDN communication channel supplied to said first site into a plurality of sub-rate ISDN communication channels, and transmitting respective ones of said plurality of sub-rate ISDN communication channels over respective ones of said plurality of transmission paths from said first site to said second site, such that the transmission frequency of a respective sub-rate ISDN channel corresponds to the frequency of said basic rate ISDN communication channel divided by the number of sub-rate ISDN communication channels in said plurality of sub-rate ISDN communication channels; and (d) at said second site, multiplexing said plurality of sub-rate ISDN communication channels transmitted in step (c) into a basic rate ISDN channel for delivery to a basic rate ISDN link served by said second site, in such a manner as to compensate for the differential transport delay between said respective ones of the plurality of transmission paths between said second site and said first site, and wherein step (b) comprises the steps of:

(b1) transmitting, over one of said transmission paths from said first site to said second site, framing structure of one of said plurality of sub-rate ISDN channels with a prescribed lead time relative to the framing structure of another of said plurality of sub-rate ISDN channels that is transmitted over another of said transmission paths from said first site to said second site, and (b2) at said second site, measuring the differential delay between framing structures of said one and said another of said plurality of sub-rate ISDN channels, so as to provide said measure of said differential transport delay between said one and said another of said plurality of transmission paths, and wherein step (b1) includes conveying information in an out of band maintenance channel of one of said sub-rate channels that marks said one of said sub-rate channels with information that allows step (b2) to determine differential transport delay between said transmission paths independent of connections of said transmission paths to said first and second sites.

2. A method of conducting integrated services digital network (ISDN) communications between a first site and a second site comprising the steps of:

(a) providing a plurality of transmission paths between said first and second sites;

(b) at said first site, demultiplexing a basic rate ISDN communication channel supplied to said first site into a plurality of sub-rate ISDN communication channels, and transmitting, over one of said transmission paths from said first site to said second site, one of said plurality of sub-rate ISDN channels with a prescribed framing structure lead time relative to the framing structure of another of said plurality of sub-rate ISDN channels that is transmitted over another of said transmission paths from said first site to said second site, such that the transmission frequency of a respective sub-rate ISDN channel corresponds to the frequency of said basic rate ISDN communication channel divided by the number of sub-rate ISDN communication channels in said plurality of sub-rate ISDN communication channels;

(c) at said second site, measuring the differential delay between framing structures of said one and said another of said plurality of sub-rate ISDN channels, so as to provide said measure of said differential transport delay between said one and said another of said plurality of transmission paths;

(d) at said second site, demultiplexing a basic rate ISDN communication channel supplied to said second site into a plurality of sub-rate ISDN communication channels, and transmitting, over a first of said transmission paths from said second site to said first site, a first sub-rate ISDN channel and, over a second of said transmission paths from said second site to said first site, a second sub-rate ISDN channel;

(e) at said second site, measuring the differential delay in framing structures of said first and said second sub-rate ISDN channels, and transmitting, in the out of band maintenance channel portion of one of said first and second sub-rate ISDN channels, first information representative of said measure of differential transport delay between said one and said another of said plurality of transmission paths, and second information representative of the measured differential framing delay from said second site to said first site;

(f) at said first site, extracting, from said out of band maintenance channel portion of one of said first and second sub-rate ISDN channels, said first, information representative of said measure of differential transport delay between said one and said another of said plurality of transmission paths, and controlling the timings of framing structures of said one and said another sub-rate ISDN channels transmitted in step (b), in accordance with said extracted first information, so as to effectively compensate for said differential transport delay between said one and said another of said plurality of transmission paths;

(g) at said first site, comparing the differential delay between framing structures of said first and second sub-rate ISDN channels with said second information, so as to derive a measure of the differential transport delay between said first and second transmission paths, and multiplexing said first and second sub-rate ISDN communication channels into a basic rate ISDN channel for delivery to a basic rate ISDN link served by said first site, in such a manner as to compensate for said measure of the differential transport delay between said first and second transmission paths between said second site and said first site; and (h) at said second site, multiplexing, into a basic rate ISDN channel for delivery to a basic rate ISDN link served by said second site, said one and said another of sub-rate ISDN communication channels transmitted in step (b), timings of framing structures of which have been controlled in step (h), so as to compensate for said measure of the differential transmission delay between said first and second transmission from said first site to said second site.

3. A method according to claim 2, wherein step (g) comprises, at said first site, delaying the faster of said first and second sub-rate ISDN channels in accordance with said measure of the differential transport delay between said first and second transmission paths, and multiplexing said one and said another of sub-rate ISDN communication channels into a basic rate ISDN channel, for delivery to a basic rate ISDN link served by said first site.

4. A method according to claim 2, wherein step (b) includes conveying information in an out of band maintenance channel of one of said sub-rate channels that marks said one of said sub-rate channels with information that allows step (c) to determine differential transport delay between said transmission paths independent of connections of said transmission paths to said first and second sites.

5. A method, of extending the transmission distance for basic rate integrated services digital network (ISDN) communications, which are normally conducted over a two-wire transmission path having an effective allowable maximum length defined by prescribed industry performance standards, comprising the steps of:

(a) providing two, two-wire transmission paths between first and second sites, which sites are separated from one another by a transmission path distance that exceeds said effective allowable maximum length;

(b) measuring the differential transport delay from said first site to said second site between a first of said two-wire transmission paths and a second of said two-wire transmission paths;

(c) demultiplexing a basic rate ISDN communication channel, supplied to said first site for transmission to said second site, into first and second half-rate ISDN communication channels, and transmitting said first and second half-rate ISDN communication channels over said first and second two-wire transmission paths, respectively; and (d) at said second site, multiplexing said first and second half-rate ISDN communication channels transmitted in step (c) into a basic rate ISDN channel for delivery to a basic rate ISDN link served by said second site, in such a manner as to compensate for said measured differential transport delay from said first site to said second site between said first of said two-wire transmission paths and said second of said two-wire transmission paths, and further including the steps of:

(e) at said second site, demultiplexing a basic rate ISDN communication channel, supplied to said second site for transmission to said first site, into third and fourth half-rate ISDN communication channels, and transmitting said third half-rate ISDN communication channel over said first two-wire transmission path from said second site to said first site, and said fourth half-rate ISDN communication channel over said second two-wire transmission path from said second site to said first site;

(f) at said second site, measuring the differential delay in framing structures of said third and fourth half-rate ISDN channels, and transmitting information representative of the measured differential framing structure delay from said second site to said first site in an out of band maintenance channel portion of one of said third and fourth half-rate ISDN channels; and (g) at said first site, comparing the differential delay between framing structures of said third and fourth half-rate ISDN channels with said information representative of the measured differential framing structure delay, so as to derive a measure of the differential transport delay between said first and second two-wire transmission paths from said second site to said first site, and multiplexing said third and fourth half-rate ISDN communication channels into a basic rate ISDN channel for delivery to a basic rate ISDN link served by said first site, in such a manner as to compensate for said derived measure of the differential transport delay between said first and second two-wire transmission paths from said second site to said first site.

6. A method according to claim 5, wherein step (g) comprises, at said first site, delaying the faster of said third and fourth half-rate ISDN channels in accordance with said measure of said differential transport delay between said first and second transmission paths from said second site to said first site, and multiplexing said third and fourth half-rate ISDN communication channels into a basic rate ISDN channel for delivery to a basic rate ISDN link served by said first site.

7. A method, of extending the transmission distance for basic rate integrated services digital network (ISDN) communications, which are normally conducted over a two-wire transmission path having an effective allowable maximum length defined by prescribed industry performance standards, comprising the steps of:

(a) providing two, two-wire transmission paths between first and second sites, which sites are separated from one another by a transmission path distance that exceeds said effective allowable maximum length;

(b) measuring the differential transport delay from said first site to said second site between a first of said two-wire transmission paths and a second of said two-wire transmission paths;

(c) demultiplexing a basic rate ISDN communication channel, supplied to said first site for transmission to said second site, into first and second half-rate ISDN communication channels, and transmitting said first and second half-rate ISDN communication channels over said first and second two-wire transmission paths, respectively; and (d) at said second site, multiplexing said first and second half-rate ISDN communication channels transmitted in step (c) into a basic rate ISDN channel for delivery to a basic rate ISDN link served by said second site, in such a manner as to compensate for said measured differential transport delay from said first site to said second site between said first of said two-wire transmission paths and said second of said two-wire transmission paths, and wherein step (b) comprises steps of:

(b1) at said first site, transmitting said first half-rate ISDN channel with a framing structure having a prescribed lead time relative to the framing structure of said second half-rate ISDN channel, and (b2) at said second site, measuring the differential delay between the framing structures of said first and second half-rate ISDN channels, so as to provide said measure of said differential transport delay, and wherein step (b1) includes conveying information in an out of band maintenance channel of one of said half-rate channels that marks said one of said half-rate channels with information that allows step (b2) to determine differential transport delay between said two-wire transmission paths independent of connections of said two-wire transmission paths to said first and second sites.

8. A method of extending the transmission distance for basic rate integrated services digital network (ISDN) communications, which are normally conducted over a two-wire transmission path having an effective allowable maximum length defined by prescribed industry performance standards, comprising the steps of:

(a) providing a pair of repeater-less, two-wire transmission paths between first and second sites, which sites are separated from one another by a transmission path distance that exceeds said effective allowable maximum length;

(b) at said first site, demultiplexing a basic rate ISDN communication channel supplied thereto into first and second half-rate ISDN communication channels, and transmitting said first half-rate ISDN communication channel over a first of said pair of two-wire transmission paths and said second half-rate ISDN communication channel over a second of said pair of two-wire transmission paths, such that framing structure of said first half-rate ISDN channel has a prescribed lead time relative to said second half-rate ISDN channel;

(c) at said second site, measuring the differential delay between framing structures of said first and second half-rate ISDN channels, so as to provide said measure of said differential transport delay between said first and second two-wire transmission paths from said first site to said second site;

(d) at said second site, demultiplexing a basic rate ISDN communication channel supplied to said second site into third and fourth half-rate ISDN communication channels, and transmitting said third half-rate ISDN communication channel over said first two-wire transmission path from said second site to said first site, and said third half-rate ISDN communication channel over said second two-wire transmission path from said second site to said first site;

(e) at said second site, measuring the differential delay between framing structures of said third and fourth half-rate ISDN channels, and transmitting, in an out of band maintenance channel portion of one of said third and fourth half-rate ISDN channels, first information representative of the measured differential framing structure delay between framing structures of said third and fourth half-rate ISDN channels, and second information representative of said measure of differential transport delay between said first and second transmission paths;

(f) at said first site, extracting said second information from said out of band maintenance channel portion of one of said third and fourth half-rate ISDN channels, and controlling the relative delay between said first and second half-rate ISDN channels transmitted in step (b), in accordance with said extracted first information, so as to effectively compensate for said differential transport delay between said first and second transmission paths;

(g) at said first site, comparing the differential delay between framing structures of said third and fourth half-rate ISDN channels with said second information, so as to derive a measure of the differential transport delay between said first and second two-wire transmission paths from said second site to said first site, and multiplexing said third and fourth half-rate ISDN communication channels into a basic rate ISDN channel for delivery to a basic rate ISDN link served by said first site, in such a manner as to compensate for said derived measure of the differential transport delay between said first and second two-wire transmission paths from said second site to said first site; and (h) at said second site, multiplexing, into a basic rate ISDN channel for delivery to a basic rate ISDN link served by said second site, said first and second half-rate ISDN communication channels transmitted in step (b), the relative delay between which has been controlled in step (f) so as to compensate for said measure of the differential transport delay between said first and second two-wire transmission paths from said first site to said second site.

9. A method according to claim 8, wherein step (g) comprises, at said first site, delaying the faster of said third and fourth half-rate ISDN channels in accordance with said derived measure of the differential transport delay between said first and second two-wire transmission paths from said second site to said first site, and multiplexing said third and fourth half-rate ISDN communication channels into a basic rate ISDN channel, for delivery to a basic rate ISDN link served by said first site.

10. A method according to claim 8, wherein step (b) includes conveying information in an out of band maintenance channel of one of said half-rate channels that marks said one of said half-rate channels with information that allows step (c) to determine differential transport delay between said two-wire transmission paths independent of connections of said two-wire transmission paths to said first and second sites.

11. An arrangement for extending the transmission distance for basic rate integrated services digital network (ISDN) communications, which are normally conducted over a two-wire transmission path having an effective allowable maximum length defined by prescribed industry performance standards, said arrangement comprising:

first and second two-wire transmission paths connecting first and second sites, each of said first and second two-wire transmission paths having a transmission path distance that exceeds said effective allowable maximum length;

at said first site, a first transceiver interface, which demultiplexes a basic rate ISDN communication channel, supplied via a first basic ISDN link to said first site for transmission to said second site, into first and second half-rate ISDN communication channels, and transmits said first and second half-rate ISDN communication channels over said first and second two-wire transmission paths, respectively; and at said second site, a second transceiver interface, which is operative to derive a measure of the differential transport delay between said first and second two-wire transmission paths from said first site to said second site, and multiplexes said first and second half-rate ISDN communication channels, that have been respectively transmitted over said first and second two-wire transmission paths to said second site, into a basic rate ISDN channel for delivery to a second basic rate ISDN link served by said second site, in such a manner as to compensate for said derived measure of the differential transport delay between said first said second two-wire transmission paths from said first site to said second site, and wherein said second transceiver interface further includes a demultiplexer, which is operative to demultiplex a basic rate ISDN channel supplied by said second basic rate ISDN link to said second site for transmission to said first site, and third and fourth half-rate transceivers, which respectively transmit said third half-rate ISDN communication channel over said first two-wire transmission path from said second site to said first site, and said fourth half-rate ISDN communication channel over said second two-wire transmission path from said second site to said first site, and wherein said second transceiver interface further includes a half-rate ISDN channel framing structure delay measurement device, which is operative to measure the differential delay between framing structures of said third and fourth half-rate ISDN channels, and inserts information representative of said measure of the differential delay between framing structures of said third and fourth half-rate ISDN channels into an out of band maintenance channel portion of one of said third and fourth half-rate ISDN channels.

12. An arrangement according to claim 11, wherein said first transceiver interface further includes a half-rate ISDN channel framing structure delay measurement device, which is operative to measure the differential delay between framing structures of said third and fourth half-rate ISDN channels, and a comparator, which compares said differential delay between framing structures of said third and fourth half-rate ISDN channels as measured by said half-rate ISDN channel framing structure differential delay measurement device with said information representative of the measured differential framing structure delay, that has been inserted into said out of band maintenance channel portion of one of said third and fourth half-rate ISDN channels, so as to derive a measure of the differential transport delay between said first and second two-wire transmission paths from said second site to said first site, and a multiplexer which is operative to multiplex said third and fourth half-rate ISDN communication channels into a basic rate ISDN channel for delivery to said first basic rate ISDN link, in such a manner as to compensate for said measure of the differential transport delay between said first and second two-wire transmission paths from said second site to said first site.

13. An arrangement according to claim 12, wherein said first transceiver interface further includes a first site delay device, which is operative to delay the faster of said third and fourth half-rate ISDN channels received at said first site, in accordance with said measure of said differential transport delay between said first and second transmission paths from said second site to said first site, and wherein said multiplexer of said first transceiver interface is operative to multiplex said third and fourth half-rate ISDN communication channels into a basic rate ISDN channel for delivery to a basic rate ISDN link served by said first site.

14. An arrangement for extending the transmission distance for basic rate integrated services digital network (ISDN) communications, which are normally conducted over a two-wire transmission path having an effective allowable maximum length defined by prescribed industry performance standards, said arrangement comprising:

first and second two-wire transmission paths connecting first and second sites, each of said first and second two-wire transmission paths having a transmission path distance that exceeds said effective allowable maximum length;

at said first site, a first transceiver interface, which demultiplexes a basic rate ISDN communication channel, supplied via a first basic ISDN link to said first site for transmission to said second site, into first and second half-rate ISDN communication channels, and transmits said first and second half-rate ISDN communication channels over said first and second two-wire transmission paths, respectively; and at said second site, a second transceiver interface, which is operative to derive a measure of the differential transport delay between said first and second two-wire transmission paths from said first site to said second site, and multiplexes said first and second half-rate ISDN communication channels, that have been respectively transmitted over said first and second two-wire transmission paths to said second site, into a basic rate ISDN channel for delivery to a second basic rate ISDN link served by said second site, in such a manner as to compensate for said derived measure of the differential transport delay between said first said second two-wire transmission paths from said first site to said second site, and wherein said first transceiver interface is operative to insert information in an out of band maintenance channel of one of said half-rate channels that marks said one of said half-rate channels with information that allows said second transceiver interface to determine differential transport delay between said two-wire transmission paths independent of connections of said two-wire transmission paths to said first and second sites.

15. A system for extending the transmission distance for basic rate integrated services digital network (ISDN) communications, which are normally conducted over a two-wire transmission path having an effective allowable maximum length defined by prescribed industry performance standards, said system comprising:

first and second two-wire transmission paths connecting first and second sites, each of said first and second two-wire transmission paths having a transmission path distance that exceeds said effective allowable maximum length;

at said first site, a first transceiver interface, which is operative to demultiplex a basic rate ISDN communication channel supplied thereto by way of a first basic rate ISDN channel link into first and second half-rate ISDN communication channels, and transmits said first half-rate ISDN communication channel over a first of said pair of two-wire transmission paths and said first half-rate ISDN communication channel over a second of said pair of two-wire transmission paths, such that framing structure of said first half-rate ISDN channel has a prescribed lead time relative to framing structure of said second half-rate ISDN channel; and at said second site, a second transceiver interface, which includes a received half-rate ISDN channel framing structure differential delay measurement device that measures the differential delay between framing structures of said first and second half-rate ISDN channels, respectively transmitted over said first and second two-wire transmission paths to said second site, and a demultiplexer which demultiplexes a basic rate ISDN communication channel, supplied by a second basic rate ISDN link to said second site, into third and fourth half-rate ISDN communication channels, and transmits said third half-rate ISDN communication channel over said first two-wire transmission path from said second site to said first site, and said third half-rate ISDN communication channel over said second two-wire transmission path from said second site to said first site, and transmits, in an out of band maintenance channel portion of one of said third and fourth half-rate ISDN channels, first information representative of said measure of differential transport delay between said first and second transmission paths, and wherein said first transceiver interface at said first site is operative to extract said first information from said out of band maintenance channel portion of one of said third and fourth half-rate ISDN channels, and to control relative delays between said first and second half-rate ISDN channels in accordance with said extracted first information, so as to effectively compensate for said differential transport delay between said first and second transmission paths, and wherein said second transceiver interface further includes a framing structure measurement device which is operative to measure the differential delay between framing structures of said third and fourth half-rate ISDN channels, and wherein said demultiplexer of said second transceiver is operative to transmit, in said out of band maintenance channel portion of one of said third and fourth half-rate ISDN channels, second information representative of the measured differential delay between framing structures of said third and fourth half-rate ISDN channels, and wherein said first transceiver interface further includes a half-rate ISDN channel framing structure differential delay measurement device, which is operative to measure the differential delay between framing structures of said third and fourth half-rate ISDN channels, and a comparator, which compares said framing structure differential delay between said third and fourth half-rate ISDN channels as measured by said half-rate ISDN channel framing structure differential delay measurement device with said second information, that has been inserted into said out of band maintenance channel portion of one of said third and fourth half-rate ISDN channels, so as to derive a measure of the differential transport delay between said first and second two-wire transmission paths from said second site to said first site, and wherein said first transceiver interface includes a multiplexer, which is operative to multiplex said third and fourth half-rate ISDN communication channels into a basic rate ISDN channel for delivery to said first basic rate ISDN link, in such a manner as to compensate for said measure of the differential transport delay between said first and second two-wire transmission paths from said second site to said first site.

16. A system according to claim 15, wherein said first transceiver interface further includes a first site delay device, which is operative to delay the faster of said third and fourth half-rate ISDN channels received at said first site, in accordance with said measure of said differential transport delay between said first and second transmission paths from said second site to said first site, and wherein said multiplexer of said first transceiver interface is operative to multiplex said third and fourth half-rate ISDN communication channels into a basic rate ISDN channel for delivery to a basic rate ISDN link served by said first site.

17. A method of extending the transmission distance for basic rate integrated services digital network (ISDN) communications, which are normally conducted over a two-wire transmission path between a first site and a second site having an effective allowable maximum length defined by prescribed industry performance standards, comprising the steps of:

(a) providing first and second two-wire transmission paths between said first and second sites;

(b) demultiplexing basic rate ISDN channels into half-rate digital subscriber loop ISDN channels that are respectively transported over said first and second two-wire transmission paths between said first and second sites;

(c) processing prescribed contents of said half-rate channels transported over said first and second two-wire transmission paths to determine differential transport delay between said first and second half-rate transmission paths;

(d) conveying information representative of the differential transport delay determined in step (c) in an out of band maintenance channel of one of said half-rate channels; and (e) controllably delaying a faster of said first and second half-rate channels, so as achieve time alignment for multiplexing said two half-rate channels back into an original basic rate channel.

18. A method according to claim 17, wherein step (c) comprises processing framing structures of said half-rate channels transported over said first and second two-wire transmission paths to determine said differential transport delay between said first and second half-rate transmission paths.

19. A method according to claim 17, wherein step (e) is carried out at each of said first and second sites.

20. A method according to claim 17, wherein step (e) is carried out at only one of said first and second sites.

21. A method according to claim 17, wherein step (b) further includes conveying information in an out of band maintenance channel of one of said half-rate channels marking said one of said half-rate channels with information that allows step (c) to determine differential transport delay between said first and second half-rate transmission paths independent of connections of said first and second two-wire transmission paths to said first and second sites.

* * * * *